Sept. 6, 1966 R. H. OKADA 3,271,583

COMPLEMENTING FLIP-FLOP

Filed Dec. 1, 1961 3 Sheets-Sheet 1

INVENTOR.
ROBERT H. OKADA

BY James J. Wood
ATTORNEY

INVENTOR.
ROBERT H. OKADA
BY James J. Wood
ATTORNEY

INVENTOR.
ROBERT H. OKADA
BY James J. Wood
ATTORNEY

United States Patent Office 3,271,583
Patented Sept. 6, 1966

3,271,583

COMPLEMENTING FLIP-FLOP

Robert H. Okada, Hillsborough, Calif., assignor to Burroughs Corporation, Detroit, Mich., a corporation of Michigan Filed Dec. 1, 1961, Ser. No. 156,290
1 Claim. (Cl. 307—88.5)

This invention relates to a complementing flip-flop and more particularly to a complementing flip-flop device utilizing a single tunnel diode as the principal component.

A tunnel diode may be defined as an abrupt and thin PN junction in materials having a very high concentration of impurity or doping elements. At very low applied voltages, such diodes have a forward voltage-ampere characteristic having a negative slope, thereby appearing as a simple negative resistance device. Because of the heavy concentrations of impurities, the Fermi levels have been moved very close to the valence and conduction bands of the respective materials. There may exist empty energy levels on one side of the junction barrier, at the same energy as electrons on the other side of the barrier. If the barrier is made sufficiently thin of the order of 100 angstroms (A.), then electrons may appear in the previously empty states much as if they had tunneled through the barrier.

A complementing flip-flop is a basic building block of all computers. (A complementing flip-flop is defined as one which changes state upon the application of the same input signal.) A great number of such components are required in every computer to satisfy the necessary functions, of memory and control. It is therefore highly desirable to reduce the number of components necessary to provide the basic flip-flop function both in the interests of economy as well as space spacing and reliability.

The present invention solves this problem by providing a tunnel diode having its anode connected through a resistor to a source of positive potential. The cathode is at ground potential, and pulse signals are then applied between the anode and ground to drive the tunnel diode between its two stable states, i.e., the high and low voltage states respectively, to provide bistable action.

Accordingly, it is an object of this invention to provide an improved bistable device of the complementing type utilizing a minimum number of components.

Another object of this invention is to provide an improved complementing flip-flop having reliable switching action between its two stable states.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1:
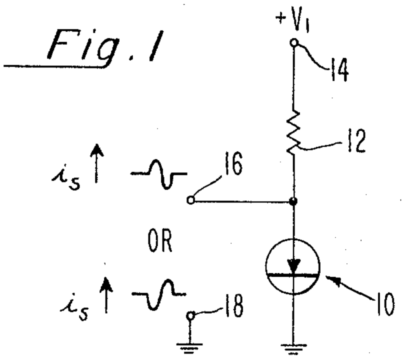
FIG. 1 is a circuit diagram of a tunnel diode operated as a complementing flip-flop in accordance with one illustrated embodiment of the invention.

Referring now to FIG. 1 of the drawing, the bistable or complementing flip-flop device comprises a tunnel diode indicated generally at 10. The cathode of the tunnel diode 10 is connected to ground, while the anode is connected to one end of a resistor 12 and to an input terminal 16. The other end of the resistor 12 is connected to a source of positive potential ($V_1$) through terminal 14. The other (grounded) input terminal is indicated at 18. The tunnel diode may be selected from any of the commercially available types such as the GaAs diode which is frequently selected because of its high voltage swing.

Figure 2:
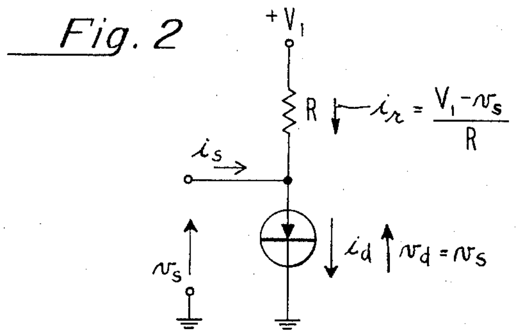
FIGS. 2 and 3 are diagrams used in explaining the operation of the device of FIG. 1.
Figure 3:
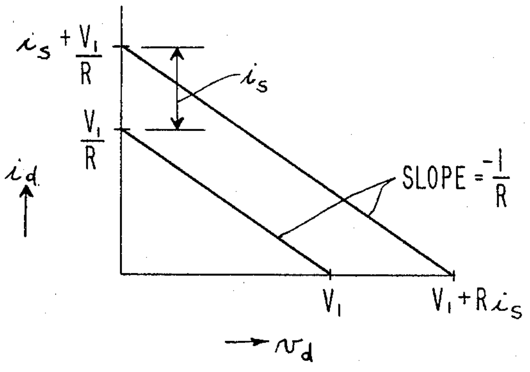

Before describing the operation of the bistable device of FIG. 1, reference will now be had to FIGS. 2 and 3. In these figures the following notations are used:

$i_s$=the instantaneous signal current
$i_d$=the instantaneous current through the tunnel diode
$+V_1$=the supply voltage for the tunnel diode
$v_s$=the instantaneous voltage of the input signal
R=the lumped resistance From Kirchoff's Law:

(1) $$i_s+\frac{V_1-v_s}{R}=i_d$$

solving for $v_s$.

(2) $$v_s=v_d=R(i_s-i_d)+V_1$$

for no applied signal $i_s=0$, (3) $$v_d=V_1-Ri_d$$

For an applied current signal (4) $$v_d=R(i_s-i_d)+V_1$$

when $i_d=0$, (5) $$v_d=Ri_s+V_1$$

when $v_d=0$, (6) $$i_d=i_s+\frac{V_1}{R}$$

From FIG. 3 the slope of the load lines are respectively:

(7) $$\frac{i_d}{v_d}=-\frac{\frac{V_1}{R}}{V_1}=-\frac{1}{R}$$

(8) $$\frac{i_1}{v_d}=-\frac{\frac{V_1+i_s}{R}}{V_1+Ri_s}=-\frac{(V_1+Ri_s)}{R(V_1+Ri_s)}=-\frac{1}{R}$$

Thus as the signal $i_s$ changes, the static load line shifts its relative position by the amount $i_s$, but remains parallel to the quiescent state ($i_s=0$) i.e., its slope is always $-1/R$. Stated differently, the static load line intercept with the current axis shifts from its quiescent value ($i_s=0$) in the direction and in the magnitude determined by the instantaneous current $i_s$, its slope being always $-1/R$.

The operation of the complementing flip-flop will now be explained with the aid of FIGS. 4A, 4B, 4C, 5A, 5B and FIG. 6. It should be understood that the explanation to follow is qualitative only, and is merely intended to give a feel for the considerations involved in successfully operating the complementing flip-flop. The assumptions underlying this qualitative description will be made clear in the discussion which follows.

Figure 4B:
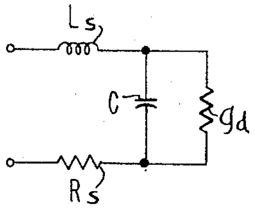
FIG. 4B is the small signal equivalent circuit of a tunnel diode.
Figure 4A:
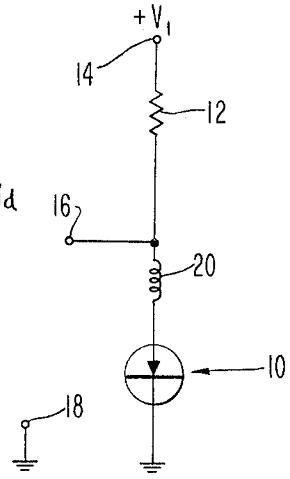
FIG. 4A is a simplified circuit diagram used in explaining the operation of the device.

Referring now to FIG. 4A, the bias resistor 12 is in series with an inductor 20 and tunnel diode 10. The equivalent circuit of the tunnel diode is shown in FIG. 4B. The circuit inductance 20 is a lumped inductance which includes the $L_s$ of the tunnel diode as well as all other inductance in the circuit. It is assumed (as is practically the case) that the inductive effect of inductance 20 is $>>>$ than the capacitive effect of capacitance C in the equivalent circuit of the diode, so that the effect of capacitance C is masked.

The load line provided by the bias resistor 12 intercepts the static characteristic at A and B (FIGS. 5A and 5B); these provide two stable points of operation for the tunnel diode. If the operating current and voltage of the tunnel diode are anywhere along the curve of operation, the circuit conditions require that the tunnel diode return to one of its two stable states of operation, i.e., either to A the low voltage point or to B the high voltage point respectively. With the inductance 20 in the circuit, the rate at which the current can change is limited—it takes a finite time for the operating point to move along the static characteristic to one of its stable states. The time required is a function of the time constant of the circuit $\tau=L/R$ where R is the incremental tunnel diode resistance plus the bias resistance 12, and L is the circuit inductance.

The term "bidirectional pulse doublet" as used throughout is understood to refer to a signal waveform such as illustrated in FIG. 1 in which the polarity of the initial pulse of the doublet may be either plus or minus, whereas the second pulse is of opposite polarity. As will be described hereinafter with reference to FIG. 9, the bidirectional pulse doublet may result simply by way of differentiation of a undirectional pulse of either a first or second polarity. The bistable device of FIG. 1 may be operated by either of the bidirectional pulse doublet waveforms ($i_s$) shown in FIG. 1 as appearing at the anode of tunnel diode 10. The amplitude of the positive and negative peaks of the bidirectional pulse doublet current signals need not be equal; their magnitudes are functions of the positions of points A and B relative to the peak current $I_p$ and the valley current point $I_v$ respectively. The relative positions of stable points A and B depend upon R and $V_1$. First we shall consider the application of the biphasic signal which is first positive going and then negative going as reproduced in FIG. 6.

Figure 5A:
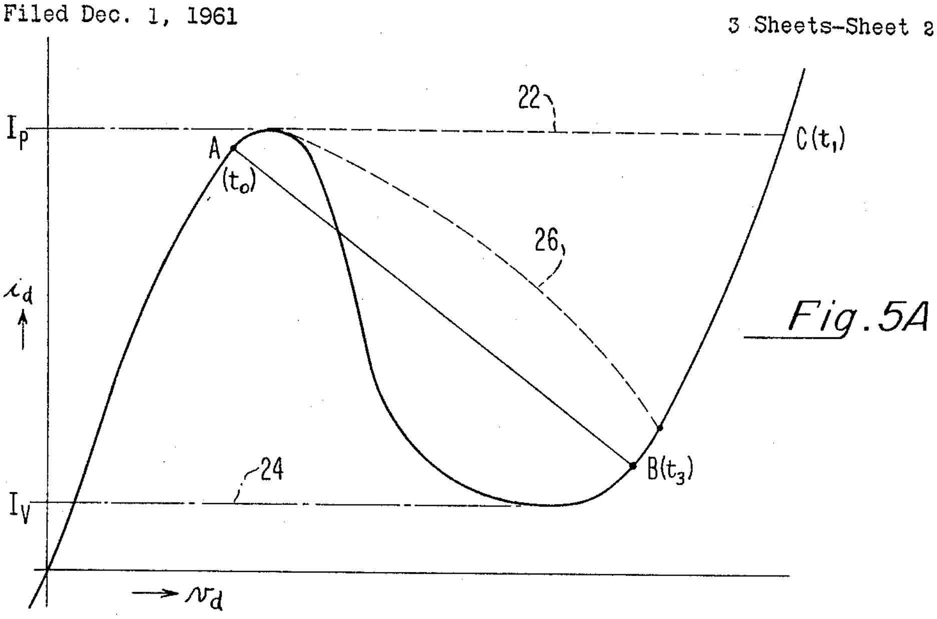
FIGS. 5A and 5B are the static characteristics of a tunnel diode and are used in explaining the operation of the embodiment of FIG. 1 when a signal having the waveshape of FIG. 6 is applied to its input.
Figure 6:
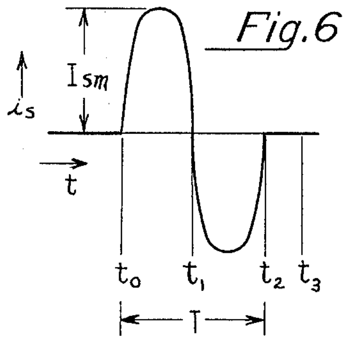
FIG. 6 is a current vs. time waveform of an input signal applied to the embodiment of FIG. 1.
Figure 4C:
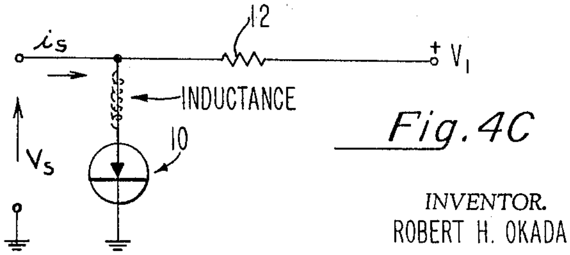
FIG. 4C is a circuit diagram of the embodiment of FIG. 1 showing the inherent inductance of the tunnel diode.

Referring now to FIG. 5A, assume that the tunnel diode 10 is at stable state A (low voltage point), and that the bidirectional pulse doublet signal waveform shown in FIG. 6 is applied to the input. The behavior of the tunnel diode 10 must take into account the inductance associated with the device (see FIG. 4). If it were not for this reactance, the one tunnel diode complementing flip-flop would not be possible since the device would go back to A upon reaching state B by the action of the negative trailing half of the signal pulse. As the signal current $i_s$ completes the cycle ($t_0$–$t_1$) (FIG. 6) the tunnel diode exceeds the peak current ($I_p$), and the diode switches from A to C (FIG. 5A) along the constant current line 22. This switching takes place in a time which $<<<\tau=L/R$ and $<$ the period T of the bidirectional pulse doublet signal of FIG. 6.

However, C is an unstable point and the circuit moves to the high voltage stable point B during the negative half of the signal which occurs in the time $t_1$ to $t_2$. The negative going portion of the signal aids in moving the operating point to the stable position at B. The period T of the bidirectional pulse doublet signal should preferably be completed before the operation point reaches B. However, this is not a necessary condition since some excursions below the point B may be tolerated provided they do not carry the transient operation so near the valley point $I_v$ that the tunnel diode will be switched along constant current line 24. In the latter case the tunnel diode would return to the initial stable point A. Thus by the proper choice of the period T of the input signal $i_s$, the negative portion of the signal $i_s$ is prevented from switching the diode back to the low voltage state A.

If the effect of the capacitance C of the tunnel diode is large compared with the effect of the inductance 20, then the tunnel diode would be switched along line 26, FIG. 5A, and not along the constant current line 22. In such case the negative portion of the signal $i_s$ would switch the diode below the valley point $I_v$ and the diode would be switched back to A. The situation may be avoided by the proper choice of tunnel diode or by inserting more inductance in the circuit.

Figure 5B:
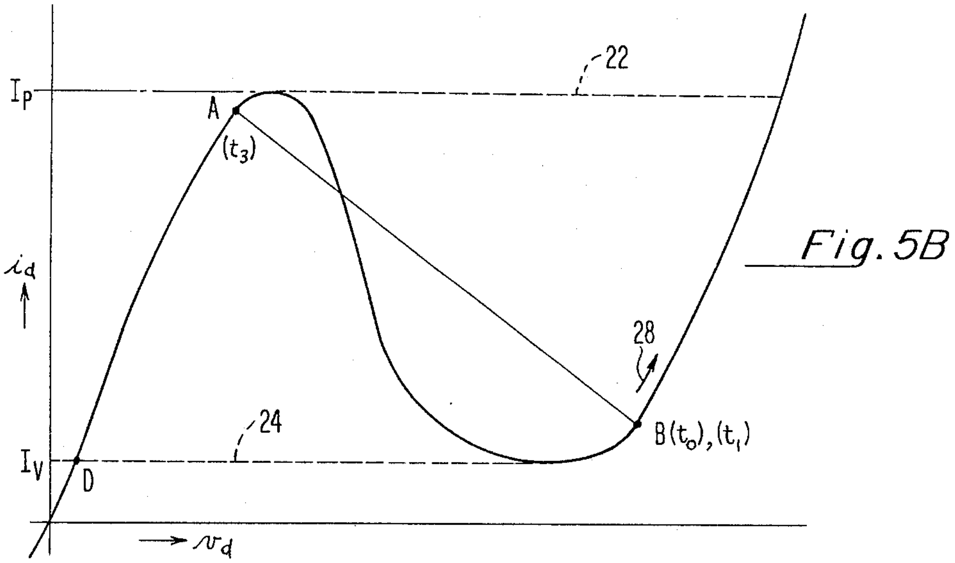

In FIG. 5B, the assumption is that the tunnel diode is at the high voltage point B and the same input signal $i_s$ (FIG. 6) is applied. The positive excursion causes the successive operating points of the tunnel diode 10 to move in the direction of the arrow 28; however at time $t_1$ the operating current voltage point is substantially at B. During the negative excursion of the signal $i_s$, the operating point is quickly carried to the valley point $I_v$ and along the constant current line 24 to the unstable point D; from here the operating point drifts toward the stable point A where it remains at some time $t_3$ when the period T is completed. Thus the same trigger signal $i_s$ successively switches the tunnel diode from A to B, B to A, A to B etc.

Figure 7A:
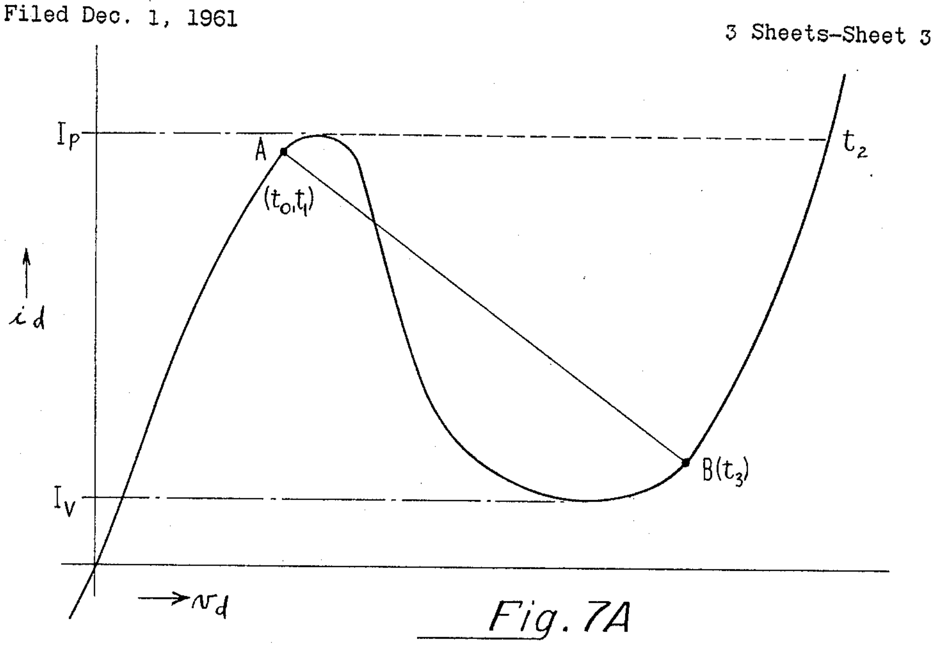
FIGS. 7A, 7B are the static characteristics of a tunnel diode used in explaining the operation of the embodiment of FIG. 1 when a signal having the waveshape of FIG. 8 is applied to its input.
Figure 7B:
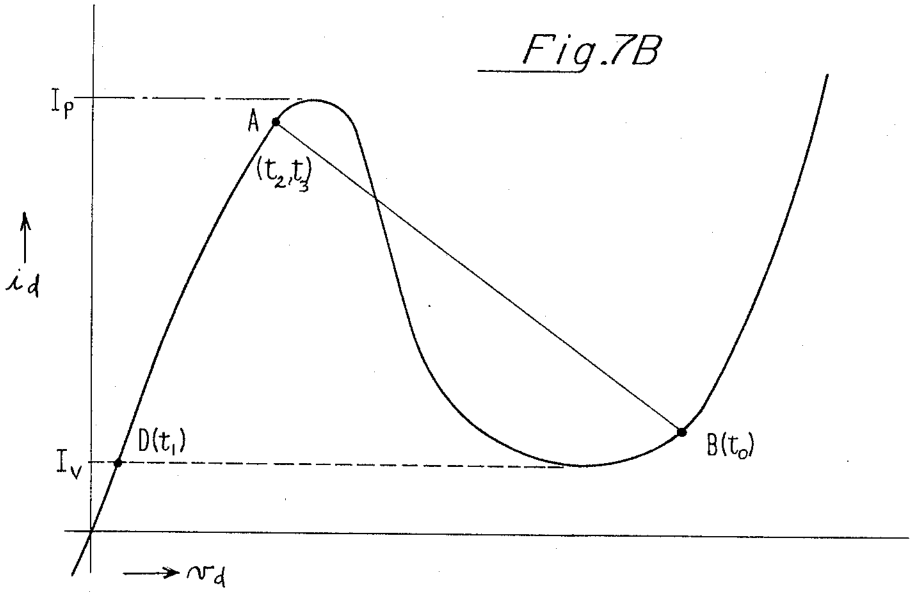
Figure 8:
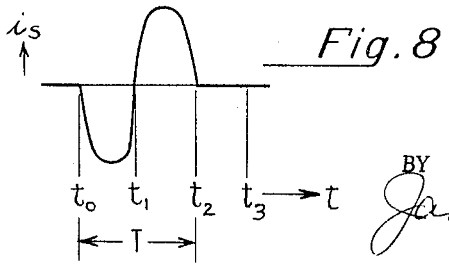
FIG. 8 is a current vs. time waveform of another type input signal applied to the embodiment of FIG. 1.

When the bidirectional pulse doublet signal waveform is first negative going, and then positive going as shown in FIG. 8, the operation of the circuit of FIG. 1 is entirely similar. When the tunnel diode is in its low voltage stable point (A) and it is being switched to the high voltage stable point (B), the trajectory of operation points is indicated by the designations $t_0$, $t_1$, $t_2$ and $t_3$ in FIG. 7A. Similarly, when the tunnel diode is in the high voltage state (B), and it is desired to switch to the low voltage state (A), the operation points are successively indicated at $t_0$, $t_1$, $t_2$, and $t_3$ in FIG. 7B.

Figure 9:
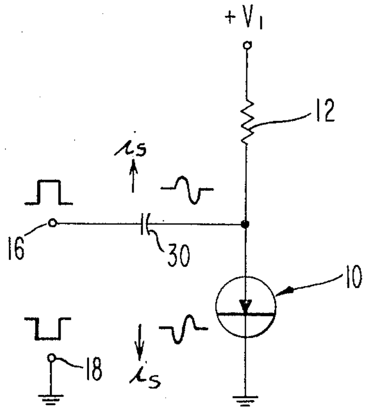
FIG. 9 is a circuit diagram of a tunnel diode operated as a complementing flip-flop in accordance with another illustrated embodiment of the invention.

A further modification of the bistable device of FIG. 1 is shown in FIG. 9. In this application a capacitor 30 is connected between input terminal 16, and the anode of the tunnel diode 10. The capacitor 30 and the resistor 12 provide the requisite differentiation of the unipolar pulses applied to the input terminals 16, 18.

In both the circuits of FIG. 9 a bidirectional pulse doublet waveform is developed after the differentiation of either of the unipolar input driving pulses shown to the left of input terminals 16, 18. Accordingly, the operation of the circuitry of FIG. 9 is exactly the same as that described in connection with FIG. 1.

Various modifications of the illustrative embodiments shown in the drawings, and various equivalent or substitutes for the elements thereof, will readily occur to those versed in the art, without departing from the spirit or scope of the instant invention. The times $t_0$, $t_1$, $t_2$ and $t_3$ associated with the various waveforms are understood to be only approximate and by way of illustration and are not to be considered as limiting. The disclosure, therefore, is for the purpose of illustrating the principles of the invention which is not to be regarded as limited except as indicated by the scope of the appended claims.

What is claimed is:

A complementing flip-flop comprising (a) a tunnel diode comprising an anode and a cathode element, (b) a resistor in series with one of said elements of said tunnel diode, (c) a bias voltage source and a reference voltage point, (d) said resistor and tunnel diode being connected between said bias voltage source and said reference voltage point such that the tunnel diode is forwardly biased, (e) said resistor being of impedance load value such that the tunnel diode may be operated at a first high current and a second low current stable state, (f) inductor means comprising the lead and tunnel diode natural inductance alone, (g) a source of input pulses of predetermined magnitude and duration, (h) means to couple said input pulses to the junction between said resistor and said tunnel diode, said last-named coupling means comprising a differentiating capacitor of value such that bidirectional pulse doublets occur at the junction between the resistor and the tunnel diode, (i) said source pulses being of magnitude and duration to provide said differentiated bidirectional pulse doublets at said junction of magnitude of excursions and duration and said inductor means and said resistor being selected of inductance and resistance value such as to provide a time constant which is large compared to the duration of one of said pulse doublets such that one of said pulse doublets appearing at said junction causes switching of said tunnel diode from the stable state at which it is then operating until the occurrence of said one of said doublets to the other said stable state and such that said tunnel diode is caused to remain in said other stable state until another pulse doublet is coupled to said junction and such that said another pulse doublet appearing at said junction causes switching back to and remaining in said then operating stable state until still another pulse doublet is coupled to said junction, (j) the parameters of said tunnel diode resistor and inductance being such that said complementing flip-flop is responsive to pulse doublets wherein selectively and at random a positive excursion or a negative excursion may be the first excursion of each pulse doublet of succeeding pulse doublets.

References Cited by the Examiner

UNITED STATES PATENTS

| | | | |
|---|---|---|---|
| 3,142,769 | 7/1964 | Kaufman | 307—88.5 |
| 3,158,841 | 11/1964 | Kam Li | 307—88.5 X |
| 3,179,813 | 4/1965 | Vernot et al. | 307—88.5 |
| 3,185,860 | 5/1965 | Ur | 307—88.5 |
| 3,204,129 | 8/1965 | Kaenel | 307—88.5 |

OTHER REFERENCES

"One Tunnel-Diode Flip-Flop," by J. F. Banzhae and H. S. Katzenstein, Proceeding of the IRE, 2–1962, page 212.

"One Tunnel-Diode Flip-Flop," by R. A. Kaenel, Proceedings of the IRE, 3–1961, page 622.

"Tunnel Diode Logic Circuits," by W. F. Chow, 6–1960, Electronics, pages 103–107.

"Tunnel Diode Memory Cell," by E. M. Davis, Jr., IBM Technical Disclosure Bulletin, vol. 2, No. 6, 4–1960.

ARTHUR GAUSS, *Primary Examiner.*

JOHN W. HUCKERT, *Examiner.*

J. JORDAN, *Assistant Examiner.*